Patented Jan. 4, 1944

2,338,297

UNITED STATES PATENT OFFICE 2,338,297

PROCESS FOR POLYMERIZING TRICHLORETHYLENE

Martin Mugdan, London, England, and Josef Wimmer, Burghausen, Upper Bavaria, Germany; vested in the Alien Property Custodian No Drawing. Application July 8, 1939, Serial No. 283,456. In Germany October 19, 1938

3 Claims. (Cl. 260—654)

This invention relates to the production of polymerization products of trichlorethylene and has for its object to provide an improved process for this purpose.

In our Patent #2,161,078 of June 6, 1939, we disclose a process for polymerizing trichlorethylene, principally to its dimerous polymer, by heating trichlorethylene in the absence of a catalyst under a pressure above atmospheric to a temperature above 150° C. and below a temperature at which substantial decomposition occurs.

During the polymerization of trichlorethylene by heating under pressure according to said Patent #2,161,078 it happens that under certain circumstances a considerable dissociation of hydrochloric acid takes place coincident with the polymerization.

We found that this secondary reaction consists in the disintegration of the principal polymerization product, i. e. dimerous trichlorethylene, according to the equation $$C_4H_2Cl_6 = C_4HCl_5 + HCl$$

and this reaction seems to be effected by a very slight quantity of impurities, mainly iron compounds which the trichlorethylene contains or absorbs from the pressure apparatus.

We have now found that this side reaction is very effectively prevented by the addition to the trichlorethylene of a very small quantity of nitrogen-containing bases or of hydroxyl-containing, mainly aromatic, compounds. Pyridine, quinoline, butylamine, piperidine, aniline, phenol, hydroquinone and naphthol have been found very effective. The reaction may result from a change in the iron compounds caused by the addition of the foregoing classes of materials. In any event, the effective compounds appear to be identical with those which serve to protect chlorinated hydrocarbons against auto-oxidation.

When an excessive quantity of these protective compounds is used the polymerization process itself is obstructed. It can easily be determined by test which quantity of each compound is the optimum amount for each type of trichlorethylene.

Example 12 kilos of trichlorethylene were heated under pressure in a lead-lined autoclave for 30 minutes to a temperature of 230° C. In the process 457 g. of hydrochloric acid were split off, which was drawn off through a valve. After distilling off the unchanged trichlorethylene 5.7 kilos of a hexachlorbutene heavily charged with pentachlorbutadiene were obtained.

Of the same trichlorethylene supply 12 kilos were mixed with 0.03 g. pyridine and heated in exactly the same manner as in the first test. The quantity of hydrochloric acid split off in this case amounted to only 35 grams. Upon distilling off the unchanged trichlorethylene, 6.2 kilos of dimerous trichlorethylene were obtained.

In other cases, with the addition of pyridine no disintegration of any kind took place with about the same quantity of transformed material. The other protective compounds mentioned above similarly prevented disintegration, the amount of each compound employed being determined in advance by test.

The invention claimed is:

1. The process for the production of dimeric trichlorethylene which comprises adding a minor amount of anti-oxidant selected from the group consisting of pyridine, quinoline, butylamine, piperidine and aniline to trichlorethylene and then heating under a pressure above atmospheric and a temperature above 150° C. and below the decomposition temperature of ethylene, the amount of said anti-oxidant being less than that capable of obstructing dimerization.

2. Process for polymerizing trichlorethylene, principally to its dimerous polymer, which comprises heating trichlorethylene under pressure above atmospheric at a temperature above 150° C. and below a temperature at which substantial decomposition occurs, in the presence of pyridine in the approximate proportions of 12 kilos of trichlorethylene to 0.03 g. of pyridine.

3. Process for polymerizing trichlorethylene, principally to its dimerous polymer, which comprises heating trichlorethylene under a pressure above atmospheric to a temperature of 150–230° C. in the presence of pyridine in the approximate proportions of 12 kilos of trichlorethylene to 0.03 g. of pyridine.

MARTIN MUGDAN.
JOSEF WIMMER.